Aug. 18, 1953        H. N. STEPHAN        2,648,999
HORIZONTAL BORING, DRILLING AND MILLING MACHINE
Filed Jan. 13, 1949                5 Sheets-Sheet 2

INVENTOR.
HALLIS N. STEPHAN
BY Hudson, Boughton,
Williams, David & Hoffmann.
ATTORNEYS Aug. 18, 1953     H. N. STEPHAN     2,648,999
HORIZONTAL BORING, DRILLING AND MILLING MACHINE
Filed Jan. 13, 1949     5 Sheets-Sheet 4

INVENTOR.
HALLIS N. STEPHAN
BY Hudson, Boughton,
Williams, David & Hoffmann.
ATTORNEYS Aug. 18, 1953 H. N. STEPHAN 2,648,999
HORIZONTAL BORING, DRILLING AND MILLING MACHINE
Filed Jan. 13, 1949 5 Sheets-Sheet 5

INVENTOR.
HALLIS N. STEPHAN
BY Hudson, Boughton,
Williams, David & Hoffmann.
ATTORNEYS Patented Aug. 18, 1953

2,648,999

UNITED STATES PATENT OFFICE 2,648,999

HORIZONTAL BORING, DRILLING, AND MILLING MACHINE

Hallis N. Stephan, Cleveland Heights, Ohio, assignor to The New Britain Machine Company, New Britain, Conn., a corporation of Connecticut Application January 13, 1949, Serial No. 70,688

4 Claims. (Cl. 77—3)

1

The present invention relates to machine tools and, more particularly, to table type horizontal boring, drilling and milling machines. This application is a continuation-in-part of my copending application Serial No. 535,278 filed May 12, 1944, entitled "Horizontal Boring Machine", now abandoned.

In horizontal boring, drilling and milling machines of the type to which the present invention relates, the cutting or working operation is performed by a tool carried upon the projecting end of a rotatable tool spindle or boring bar supported in a spindle head and reciprocable lengthwise therein. The spindle head is, in turn, supported for vertical movement along a column with the projecting end of the tool spindle overlying a work table supported for movement transversely of the axis of the tool spindle on a longitudinally movable saddle; that is, a slide movable lengthwise of the axis of the spindle. The bed of the machine is of generally elongated, rectangular shape, with the spindle head column projecting therefrom adjacent to one end, and the saddle is slidably supported upon upwardly facing, horizontal ways formed on the top of the bed and extending lengthwise thereof. The bed is adapted to rest upon a factory floor with the top of the table about two or three feet thereabove and the machine can be moved as a unit from one location to another. Machines of this type are commonly referred to as "table type" horizontal boring, drilling and milling machines. The bed is relatively long and narrow, being made narrow so that the operator can approach close to the spindle head, upon which it is customary to locate many of the controls, and to the projecting end of the tool spindle so that he can observe the action of the tool upon the work without the necessity of climbing up on the machine.

In practically all instances it is desirable to have as great a table travel as is consistent with other requirements of the machine and the length of the saddle is usually greater than the width of the bed, with the result that the saddle overhangs the bed and the main ways thereon at both the front and rear of the machine. This overhanging of the saddle with respect to the ways of the bed decreases the accuracy of the machine as the table approaches either of its limits of movement. Attempts to reduce the overhang of the saddle have either resulted in a decreased movement of the table, in a construction which interferred with the movement of the operator about the machine, or have otherwise been unsatisfactory.

2

The principal object of the present invention is the provision of a novel and improved, table type horizontal boring, drilling and milling machine of the character referred to so constructed and arranged that the length of the saddle and, in turn, the table travel can be increased without loss of accuracy and without unduly obstructing the movement of the operator about the machine. In fact, the preferred construction hereinafter shown facilitates movement of the operator about the machine.

Another object of the invention is the provision of a novel and improved, horizontal boring, drilling and milling machine of the type referred to having a bed adapted to rest upon a floor or suitable supports, which bed, in addition to the conventional, upwardly facing, main saddle supporting ways, which ways are usually located from two to three feet above the floor level, comprises upwardly facing, auxiliary saddle supporting ways located to the outside of and at a lower level than the main saddle supporting ways, the auxiliary ways being formed on integral parts or extensions of the bed proper located outwardly of the main saddle supporting ways with the said extensions including means forming direct horizontal connections between the auxiliary ways and the main part of the bed and also direct vertical support between the auxiliary ways and the floor or supports upon which the bed is placed, whereby the auxiliary ways are rigidly supported against deflection under the influence of both lateral and vertical forces exerted thereon by said saddle so that loads may be supported on the saddle adjacent the ends of the latter without deflection thereof.

A further object of the invention is the provision of a novel and improved, horizontal boring, drilling and milling machine of the type referred to having a bed adapted to rest upon a floor or suitable supports, which bed, in addition to the conventional, upwardly facing, main saddle supporting ways, which ways are usually located from two to three feet above the floor level, comprises upwardly facing, auxiliary saddle supporting ways located to the outside of and at a lower level than the main saddle supporting ways, which auxiliary ways are formed on integral parts or extensions of the bed proper located outwardly of the main saddle supporting ways, and which bed also includes means forming a direct, vertical support between the auxiliary saddle supporting ways and the floor or supports upon which the bed is placed, in combination with means for leveling the bed ways with respect to each other and the saddle with respect to the bed ways.

A further object of the invention is the provision of a novel and improved, horizontal boring, drilling and milling machine of the type referred to having a bed adapted to rest upon a floor or suitable supports, which bed, in addition to the conventional, upwardly facing, main saddle supporting ways, which ways are usually located from two to three feet above the floor level, comprises upwardly facing, auxiliary saddle supporting ways located to the outside of and at a lower level than the main saddle supporting ways, which auxiliary ways are formed on integral parts or extensions of the bed proper located outwardly of the main saddle supporting ways, in combination with ways on the bed adjacent to the main saddle ways but facing in a downward direction, and means on the saddle for engaging said downwardly facing ways whereby any extension of the saddle beyond the top auxiliary ways produces a cantilever support effect.

A further object of the invention is the provision of a novel and improved bed for a horizontal boring, drilling and milling machine of the type referred to, which bed, in addition to having the conventional, upwardly facing, saddle supporting ways is provided with upwardly facing, auxiliary saddle supporting ways located to the outside of and below the level of the main saddle supporting ways, which auxiliary ways are formed on integral parts or extensions of the bed proper located outwardly of the main saddle supporting ways, and which bed also includes means forming a direct, vertical support between the auxiliary saddle supporting ways and the floor or supports upon which the bed is placed.

A further object of the invention is the provision of a novel and improved bed for a horizontal boring, drilling and milling machine of the type referred to, which bed, in addition to having the conventional, upwardly facing, saddle supporting ways is provided with upwardly facing, auxiliary saddle supporting ways located to the outside of and below the level of the main saddle supporting ways, which auxiliary ways are formed on integral parts or extensions of the bed proper located outwardly of the main saddle supporting ways, and which bed also is provided with ways adjacent to the main saddle way but facing in a downward direction.

The invention resides in certain constructions and combinations and arrangements of parts and further objects and advantages will be apparent to those skilled in the art to which it relates from the following description of the preferred embodiments described herein with reference to the accompanying drawings, forming a part of this specification, in which similar reference characters designate corresponding parts throughout the several views, and in which Fig. 1 is a perspective view of a table-type, horizontal boring, drilling and milling machine embodying the present invention;

Figure 1:
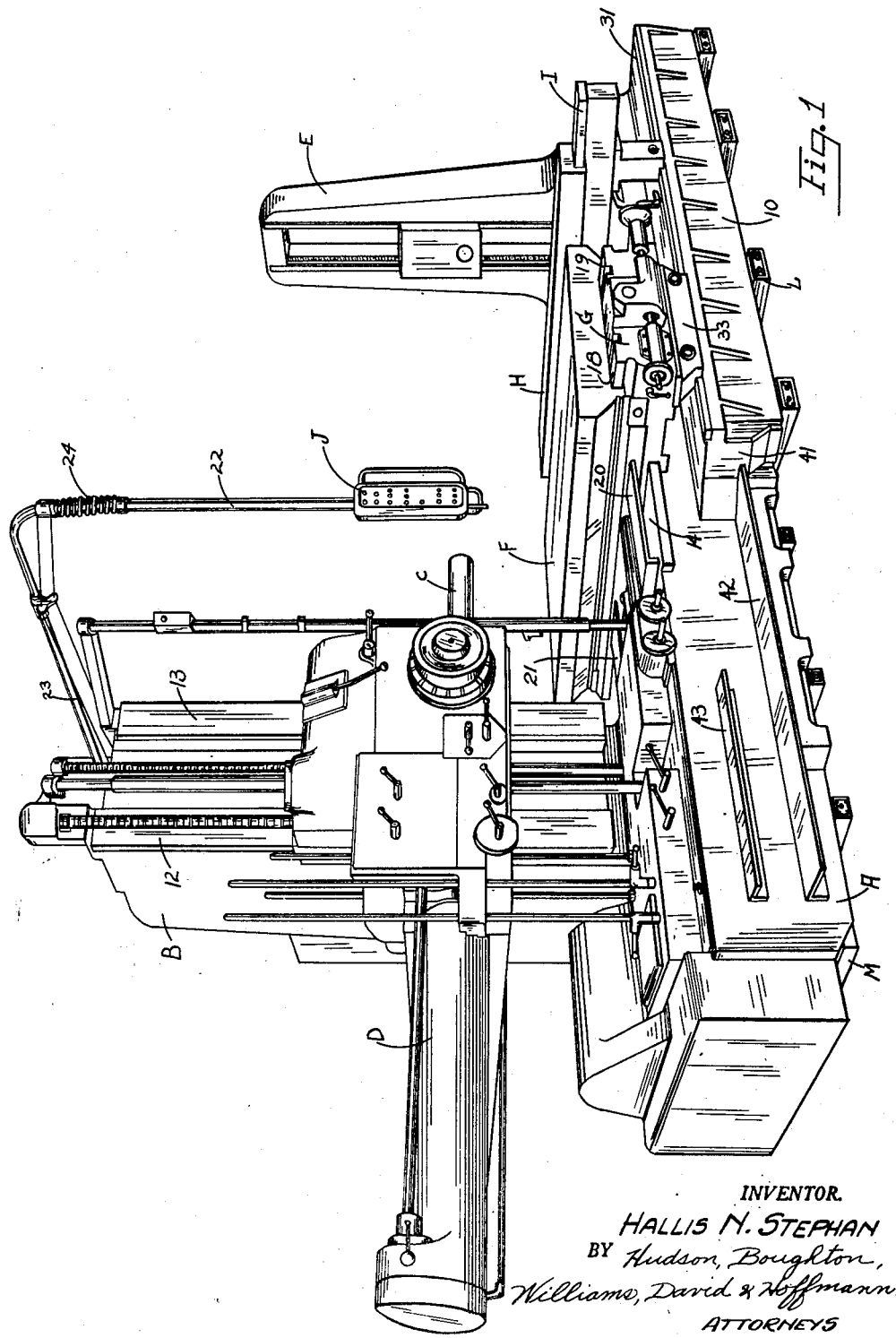

While the invention is susceptible of various modifications and alternative constructions, it is herein shown and described as embodied in a horizontal boring, drilling and milling machine similar to that shown in United States Patent No. 2,339,435, issued January 18, 1944. Only those parts of the machine which are necessary to an understanding of the present invention are shown in the present drawings and described herein in detail.

Referring to Figs. 1 to 8 of the drawings, the machine shown comprises a base or bed A provided with a spindle head column B adjacent to one end thereof. The base or bed A includes side parts in the form of horizontal extensions or projections 10 and 11 at opposite sides thereof formed integral therewith and extending from the right-hand end of the machine, as viewed in Figs. 1 and 2, to a point adjacent to the spindle head column. The extensions or side parts 10 and 11 of the bed are about half the height of the bed proper and will be hereinafter more specifically described. The tool spindle C is supported for rotation about a horizontal axis in a spindle head D slidably supported by means, including vertical ways 12 and 13, for vertical movement along the front face of the spindle head column B. An outboard or backrest support column E is located adjacent to the opposite end of the bed A and is slidably supported for reciprocation toward and from the spindle head column B upon upwardly facing, horizontal main saddle supporting ways 14 and 15 formed on the upper surface of slightly raised portions or pads 16, 17 on the top side of the bed A and extending longitudinally thereof from the right-hand end of the machine approximately to the spindle head column B. The extensions or side parts 10 and 11 and the main saddle supporting ways 14 and 15 are substantially coextensive in length except for the left-hand end of the front extension 10 which is shortened in a manner and for a purpose hereinafter referred to.

The work is adapted to be supported upon a table F slidably supported for movement transversely of the axis of the spindle upon table supporting ways 18 and 19 formed upon the top of a saddle G located intermediate the spindle head column B and the backrest column E and movable therebetween along the main saddle supporting ways 14 and 15. In addition to the main table F, the machine shown includes an auxiliary table H slidably supported for movement transversely of the length of the spindle upon an auxiliary saddle I supported and movable on the bed A in a manner similar to that in which the main saddle G is supported and movable thereon. The main saddle supporting ways 14 and 15 are covered by conventional way guards 20 and 21, respectively, which way guards project through suitable openings in the backrest column, main saddle and auxiliary saddle; that is, the machine elements E, G and I. In the machine shown, the different movements of the various machine elements, such as the rotation and reciprocation of the spindle C, and the reciprocation of the spindle head D, saddles G and I, tables F and H, etc., may be effected by power and controlled from a pendant control station J fixed to the lower end of a tube 22 connected to a universally movable arm 23 by a flexible cable 24. Various rates of feed and spindle speeds can be selected by the various levers on the spindle head D, etc. With the exception of the extensions or side parts 10 and 11 of the bed A, the machine thus far described is similar to that disclosed in the aforesaid patent to which reference is made for a complete description thereof.

Prior to the present invention, the accuracy of the work which could be performed on the machines of the character referred to decreased rapidly as the work table was moved toward either end of the saddle. Past attempts to overcome this difficulty have not been successful. According to the present invention, the desired accuracy is obtained by supporting one or both ends of the saddle on upwardly facing, auxiliary ways formed on the top of integral parts of the bed proper extending outwardly beyond the main saddle supporting ways and so arranged that they do not interfere with the movement of the operator about the machine. In fact, the construction is such that it facilitates the movement of the operator about the machine.

Figure 3:
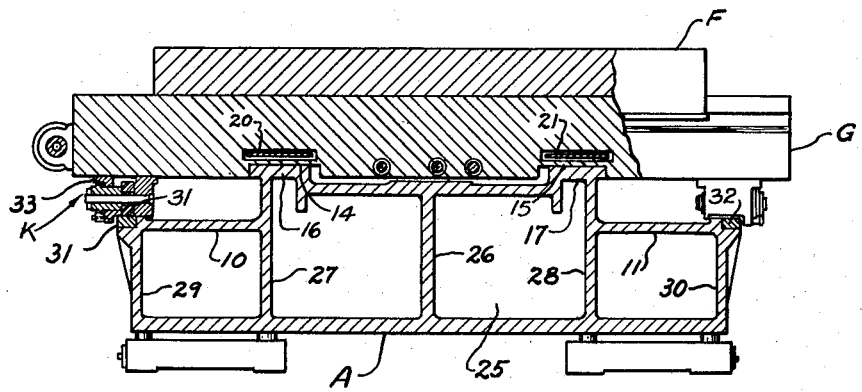
Fig. 3 is a sectional view, with portions in elevation, approximately on the line 3—3 of Fig. 2.

As shown, the bed A is an integral, hollow steel casting provided with a plurality of longitudinally spaced, transverse, vertical webs 25 extending from one side of the bed to the other and transversely spaced, longitudinal, vertical webs 26, 27, 28, 29 and 30 forming vertical walls or sides, see Fig. 3. The vertical webs or walls 27, 28 are located directly underneath the main saddle supporting ways 14 and 15 and form sides of the main part of the bed. The webs or vertical walls 29, 30 are located directly underneath the auxiliary saddle supporting ways 31 and 32 formed on the top or upper side of the side parts or extensions 10 and 11 of the bed forming the side walls thereof, the side parts or extensions 10 and 11 being substantially rectangular in cross section with the tops or upper sides extending generally horizontally and united with the main part of the bed. The auxiliary saddle supporting ways 31, 32 support the outer ends or overhang of the saddle through the medium of downwardly extending way engaging means or roller assemblies, designated generally as K, interposed therebetween and the underside of the saddle. Two rollers are employed in each of the assemblies at opposite ends of the main saddle G which is comparatively wide and one roller in the assembly at each end of the saddle I, however, it will be understood that any desired number of rollers may be employed.

Figure 4:
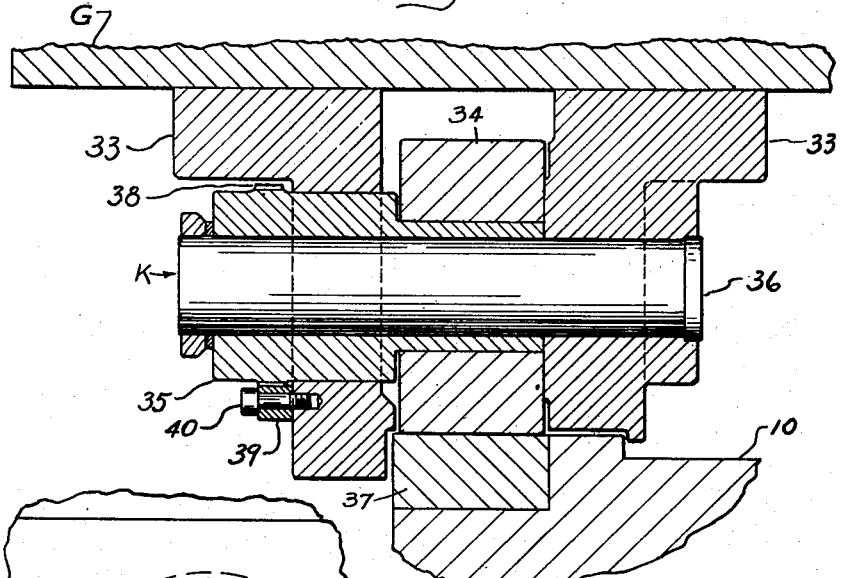
Fig. 4 is an enlarged view of a portion of Fig. 3.
Figure 5:
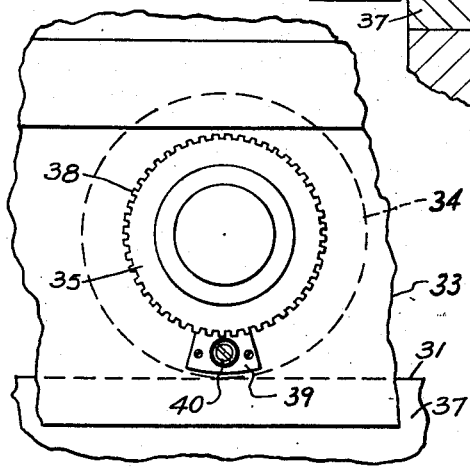
Fig. 5 is an end view of the mechanism shown in Fig. 4.

The roller assemblies K, referred to, are similar in construction and the particular assembly shown in Fig. 4 will be described. The roller assembly shown therein comprises a frame or bracket member 33 bolted or otherwise fixed to the underside of the saddle adjacent to the front end thereof, and roller means adjustably supported by the bracket 33. The roller means comprises a pair of rollers 34 located within a recess in the bracket 33 and each of the rollers 34 is rotatably supported on an eccentric surface of a sleeve 35, which sleeve is, in turn, rotatably supported on a short shaft 36, the right-hand end of which, as viewed in Fig. 4, is non-rotatably fixed in the bracket 33. The rollers 34 engage the auxiliary way 31 which, in the preferred embodiment, is formed by a hardened insert 37 welded or otherwise fixedly secured to the top or upper side of the extension or side part 10 adjacent to its outer edge. The rear auxiliary way 32 is preferably formed in a similar manner. The eccentric sleeves 35 provide means for adjusting the rollers 34 relative to the bracket 33 and, in turn, the end of the saddle G with respect to the way 31. For the purpose of locking the eccentric sleeves 35 in any adjusted position, each sleeve is provided with a means comprising gear or gear teeth 38 engaged by cooperating teeth on a sector-like locking member 39 carried by a machine screw 40 threaded into a tapped aperture in the bracket 33. In addition to constituting a support for the locking member 39, the machine screw 40 comprises means for selectively holding the locking member in fixed relation to the bracket 33.

Figure 2:
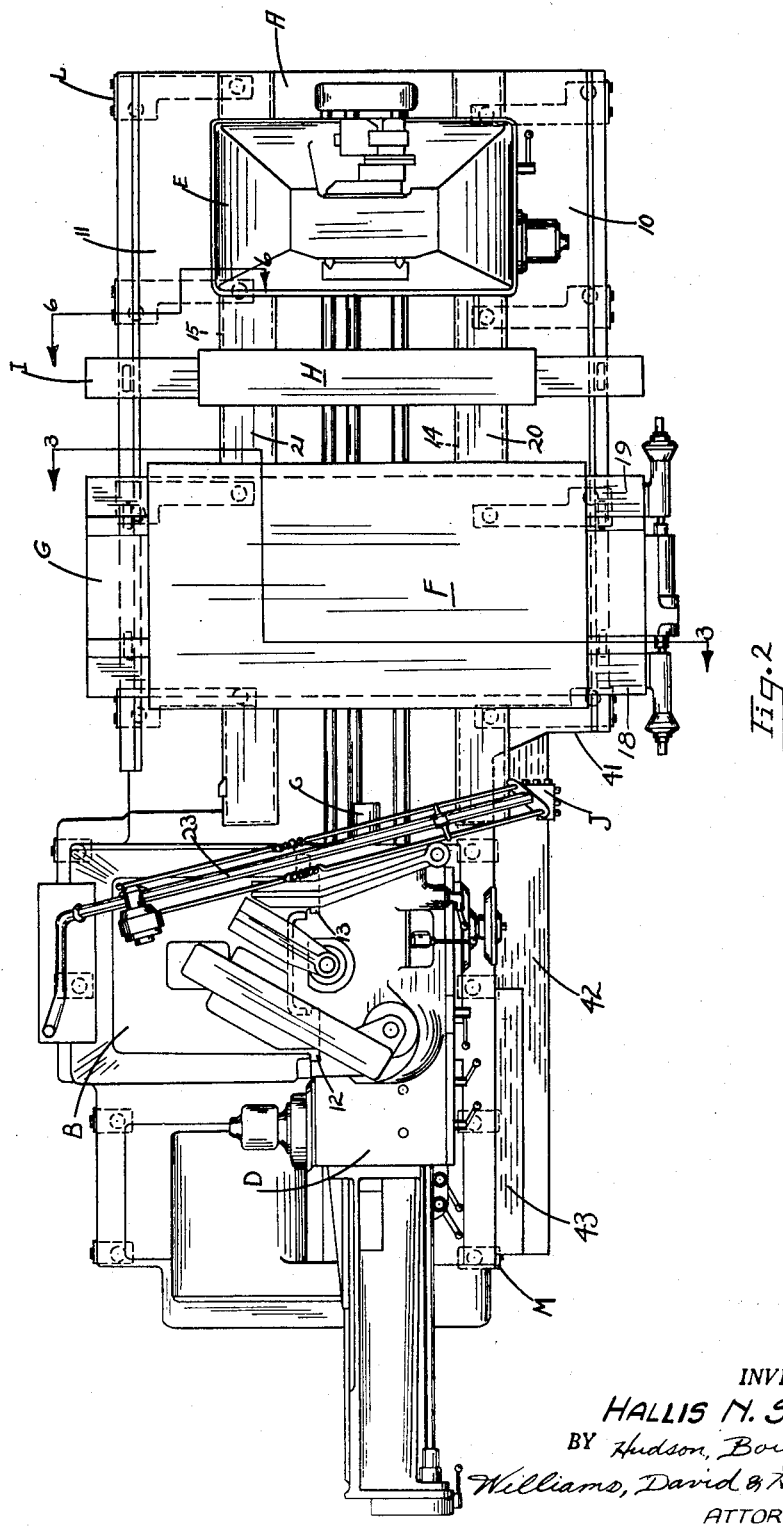
Fig. 2 is a plan view of the machine shown in Fig. 1.

As clearly shown in Figs. 1 and 2, the extension or side part 10 at the front of the base or bed stops short of the spindle head column, thus permitting an operator to approach the tool, etc., when the spindle is in a retracted position with the same ease that he would approach it provided the projection 10 was omitted altogether and the saddle overhang with respect to the main ways unsupported. In the machine shown, the end 41 of the projection 10 is offset longitudinally approximately eighteen inches with respect to the right-hand end of the spindle head housing, as viewed in Fig. 2, and the left-hand roller in the front assembly K is spaced from the left-hand side of the saddle G in such a manner that the saddle can be moved to its extreme left-hand position without disengaging the roller from the way 31.

With the construction shown, an operator can stand in the angle formed by the base to the left of the left-hand end of the extension 10 and the end of the extension and observe the cutting operation with the same ease that the cutting operation could be observed provided the extension 10 was omitted altogether. Instead of interfering with the free movement of the operator about the machine, the extension 10, in fact, facilitates his movement thereabout. As shown, the main saddle supporting ways 14 and 15 are approximately two feet above the floor level while the top of the side parts or extensions 10 and 11 are approximately fifteen inches thereabove, thus an operator can readily step onto the extensions and from there onto the way guards, the saddle or the table, as desired. Preferably, steps 42 and 43 similar to those shown in my aforesaid patent, are employed on the front of the bed to facilitate reaching the various controls on the spindle head, etc. As shown, the step 42 extends to near the end of the extension 10.

Because of the difficulty of manufacturing the main and auxiliary saddle supporting ways level, and the greater difficulty of maintaining the same level during operation of the machine because of variations in the floor or surface upon which the machine is supported, the present invention contemplates the use of vertically adjustable members or jacks, designated generally by the reference character L, interposed between the bottom of the bed proper and the floor or other supporting surface, which members or jacks engage the bed directly or substantially directly underneath the vertical webs or walls 27 to 30, inclusive. In the embodiment shown, four longitudinally spaced jacks L are positioned underneath each side of the machine and each jack supports the adjacent main and auxiliary way.

Figure 6:
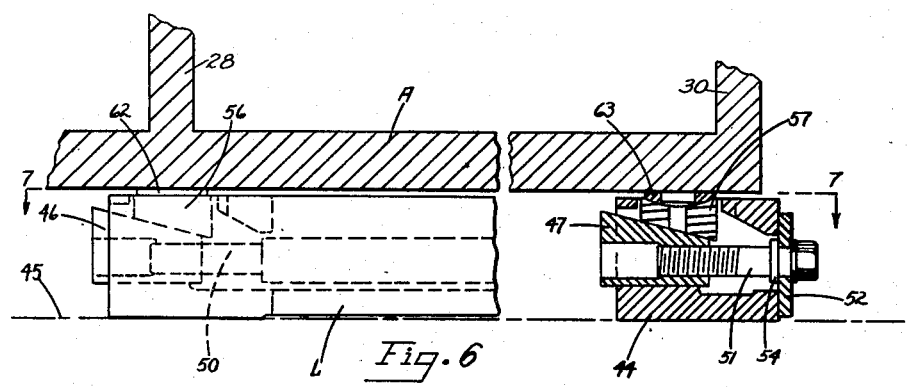
Fig. 6 is an enlarged sectional view approximately on the line 6—6 of Fig. 2.
Figure 7:
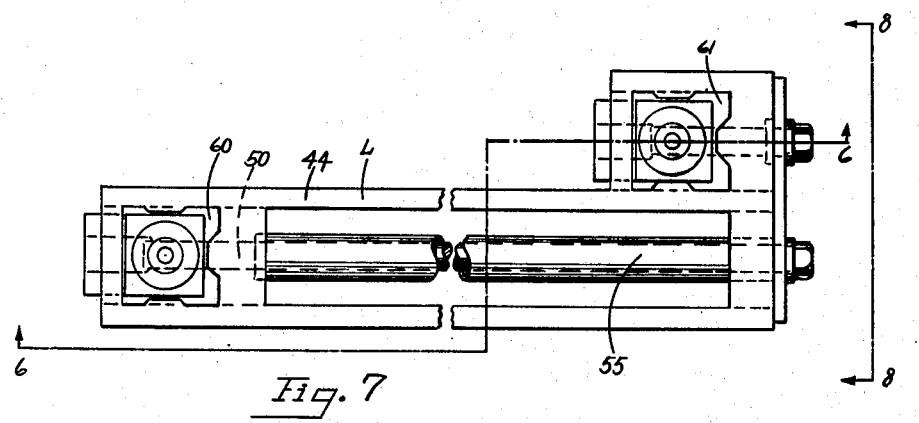
Fig. 7 is a view approximately on the line 7—7 of Fig. 6.
Figure 8:
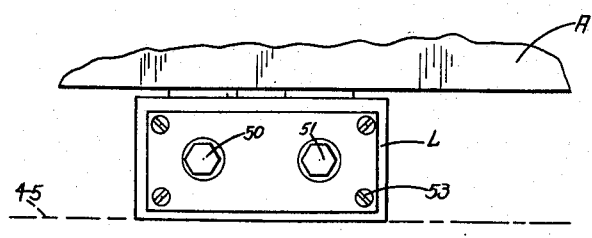
Fig. 8 is a view approximately on the line 8—8 of Fig. 7.

The jacks L are identical in construction and one is shown in considerable detail in Figs. 6, 7 and 8. Each jack L comprises a frame 44 adapted to rest upon a floor or the like, the upper supporting surface of which is indicated by the dot-dash lines 45 in Figs. 6 and 8. The frame 44 is of hollow construction and has housed therein a plurality of spaced, wedge members 46 and 47, one located approximately underneath each of the vertical webs or walls 28 and 30, the former of which webs or walls supports the main way 15 while the latter supports the auxiliary way 32. The wedge members 46 and 47 are adapted to be moved transversely of the length of the base or bed A by screws 50 and 51, respectively, the head ends of which are rotatably supported in a member 52 fixed to the right-hand end of the frame 44 by machine screws 53. A collar member 54 fixed to the screw 51 behind the member 52 prevents longitudinal movement of the screw 51 relative to the frame 44, and longitudinal movement of the screw 50 is prevented in a similar manner by a tubular sleeve 55 surrounding the screw 50 and supported at opposite ends in the frame 44.

The upper inclined surfaces of the wedge members 46 and 47 engage similar inclined surfaces on the bottom of vertically movable members 56 and 57, respectively, which members are rectangular in shape, in plan view, and are slidably supported in apertures 60, 61 formed in the frame 44. The members 56 and 57 are provided with aligning washers 62, 63 having lower spherical surfaces which engage within similar spherical surfaces in the top of the members 56 and 57, respectively. The upper surfaces of the aligning washers engage the bottom of the base or bed A of the machine proper. The frame 44 of each jack L is elongated, as clearly shown in Fig. 7, and the aligning washers engage the base or bed A at transversely spaced points, which points, as previously stated, are preferably substantially underneath the vertical walls or webs which, in turn, support the ways. This construction permits the horizontal main and auxiliary ways to be accurately leveled with respect to each other regardless of the unevenness of the surface upon which the machine may be supported, by merely rotating the screws 50 and 51 which, in turn, moves the wedge members 46 and 47 to raise and lower the base-engaging aligning washers, depending upon the direction of rotation of the screws. In the embodiment shown, the base or bed of the machine, other than the end upon which the horizontal ways are formed, is supported by a plurality of jacks M similar to the jacks L previously described but merely constituting a single, vertically adjustable, base-engaging member.

Figure 9:
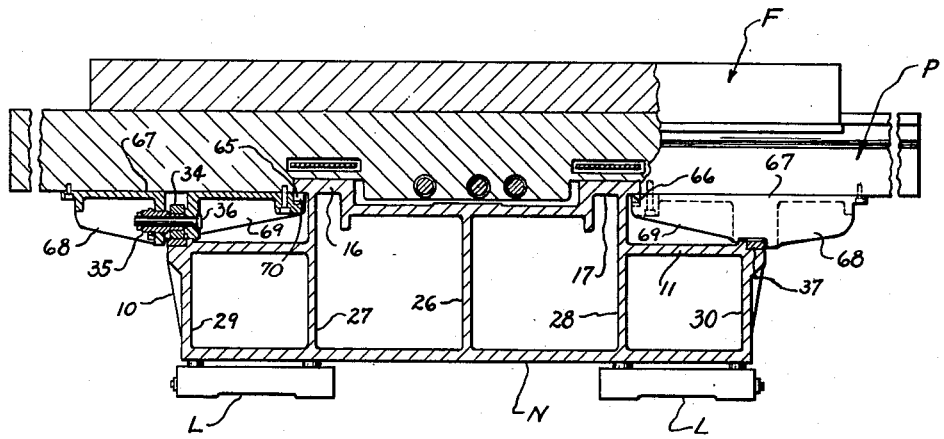
Fig. 9 is a view similar to Fig. 3 but showing a modified construction.
Figure 10:
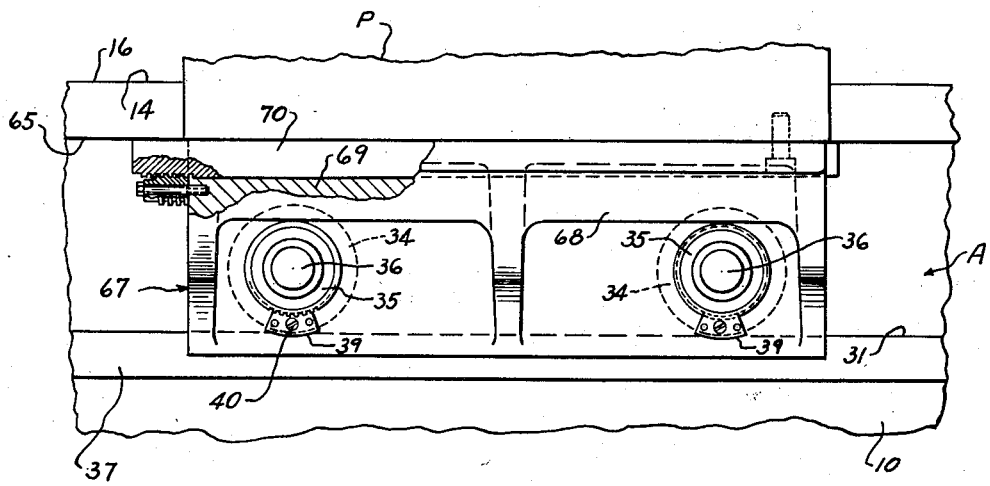
Fig. 10 is a fragmentary end view of Fig. 9, with portions broken away.

The construction shown in Figs. 9 and 10 is similar to that shown in Figs. 1 to 8 except that the saddle has been elongated, the main part of the bed provided with ways adjacent to and facing in the opposite direction from the main saddle supporting ways, and the construction of the frame members or brackets of the roller means or assemblies changed so as to include a part extending toward the main saddle supporting ways and engaging with the downwardly facing ways adjacent to the main saddle supporting ways. The parts already described, which are duplicated in Figs. 9 and 10, are designated by the same reference characters as are the various parts of the bed N, which is exactly like the bed A except for the provision of downwardly facing ways 65, 66 on the lower surfaces of the outwardly projecting sides of the longitudinally extending, raised portions or pads 16, 17 of the bed, upon the upper surfaces of which raised portions the main saddle supporting ways 14 and 15 are formed. The saddle P is the same as saddle G except that it is longer.

The downwardly extending way engaging means or roller assemblies which replace the previously described roller assemblies include frame members or brackets 67 incorporating the vertical webs of the brackets 33, which webs extend lengthwise of the bed and between which the rollers 34 are located and, in addition thereto, include outwardly projecting portions 68 which are bolted to and support the overhanging part of the saddle and inwardly projecting parts 69, the innermost parts of which underlie the downwardly facing ways 65, 66. Suitable adjustable gibs 70 interposed between the parts 69 of the brackets 67 provide means for taking up wear between the brackets and the ways and maintaining the parts free from play.

Each of the frame or bracket members 67 support two rollers 34 in engagement with the auxiliary saddle supporting ways 31, 32 on the bed. The rollers associated with each bracket or frame member 67 are spaced lengthwise of the bed and are adjustably supported in the brackets 67 in a manner similar to that in which the corresponding rollers are supported in the brackets 33.

The brackets or frame members 67 include suitable vertical webs extending lengthwise of the saddle and form supports which, in effect, strengthen the saddle. Reference to Fig. 9 will show that if the table F is moved to either end of the saddle, any tendency of the saddle to bend will be resisted by upward pressure of the inner ends of the parts 69 of the brackets 67 against the downwardly facing ways 65, 66. The effect is that of a cantilever support.

From the foregoing description of the preferred embodiments of the invention, it will be apparent that the objects heretofore enumerated and others have been accomplished and that a new and improved, horizontal boring, drilling and milling machine has been provided which is capable of performing extremely accurate work throughout a wide range of table movements and wherein the overhang of the saddle with respect to the main saddle ways is supported upon auxiliary ways, which auxiliary ways are, in turn, supported directly from the floor surface and horizontally connected with the main part of the bed so that they cannot deflect under either vertical or lateral forces exerted by the saddle. Moreover, the auxiliary ways are so constructed that they do not materially interfere with the free movement of the operator about the machine and particularly about the tool end of the spindle head. Novel and improved means have also been provided for leveling the main and auxiliary saddle supporting ways relative to each other.

While two embodiments of the invention have been shown in the drawings and herein described in considerable detail, the invention is not limited to the particular constructions shown and it is my intention to cover hereby all adaptations and modifications and uses thereof which come within the practice of those skilled in the art to which the invention relates and the spirit and scope of the appended claims.

Having thus described my invention, I claim:

1. An adjustable way engaging assembly for the saddle of a machine tool, comprising a pair of spaced frame members adapted to be fixed to said saddle and having a shaft extending therethrough and fixed in one of said members, a sleeve extending through the other of said members and rotatably supported therein and on said shaft and having a surface intermediate said members eccentric to the axis of rotation, means operatively associated with said eccentric surface for engaging the way of a machine tool whereby rotation of said sleeve effects a linear movement of said means and adjusts the position thereof relative to said way, and other means for fixing the sleeve in any adjusted position.

2. An adjustable way engaging assembly for supporting the saddle of a machine tool relative to a way on the machine tool, comprising a pair of spaced frame members adapted to be fixed to said saddle and having a shaft extending therethrough and fixedly mounted in one of said frame members with an axis parallel to the surface of said way, a sleeve extending through the other of said members and rotatably supported therein and on said shaft and having a surface eccentric to said axis, roller means rotatably supported on said eccentric surface adapted to have its axis of rotation moved relative to said table by rotation of said sleeve and adjust the relative position of said saddle relative to said way, and other means for positively fixing the position of said sleeve in any adjusted position.

3. In a horizontal boring, drilling and milling machine, the combination of a bed comprising a generally elongated hollow rectangular shaped main part having vertical walls or sides extending from the top to the bottom thereof and side parts of less height fixed to said main part and extending lengthwise along opposite sides thereof and having vertical walls or sides extending from the top to the bottom thereof, upwardly facing main saddle supporting ways on the upper side of said main part of said bed directly above said vertical walls or sides thereof, downwardly facing ways on said main part of the bed adjacent to said upwardly facing main ways, auxiliary saddle supporting ways on the upper sides of said side parts of said bed directly above said vertical walls or sides thereof, said auxiliary ways being located to the outside of said main ways, a saddle supported on said main saddle supporting ways, bracket members fixed to the underside of said saddle outwardly thereof relative to said main saddle supporting ways and having parts thereof projecting underneath said downwardly facing ways, rollers in engagement with said auxiliary ways, means connecting said rollers to said bracket members including means for adjusting said rollers toward and from said auxiliary ways, and adjustable gibs carried by said bracket members and engaging underneath said downwardly facing ways, whereby the said saddle is supported adjacent the ends thereof as well as intermediate its ends in a manner preventing deflection of said saddle regardless of the position of a load supported thereon.

4. In a horizontal boring, drilling and milling machine, the combination of a bed comprising a generally elongated hollow rectangular shaped main part having vertical walls or sides extending from the top to the bottom thereof and side parts of less height fixed to said main part and extending lengthwise along opposite sides thereof, the said side parts having generally rectangular cross sections with vertical walls or sides extending from the top to the bottom thereof, upwardly facing main saddle supporting ways on the upper side of said main part of said saddle directly above said vertical walls or sides thereof, downwardly facing ways on said main part of the bed adjacent to said upwardly facing main ways, auxiliary saddle supporting ways on the tops of said side parts of said bed directly above said vertical walls or sides thereof, said auxiliary ways being located outwardly relative to said main ways, a saddle supported on said main saddle supporting ways, bracket members fixed to the underside of said saddle outwardly thereof relative to said main saddle supporting ways and having parts thereof projecting underneath and engaging the lower surfaces of said downwardly facing ways, way engaging means movably supported on said auxiliary ways, and means connecting said way engaging means to said bracket members including means for adjusting said way engaging means vertically relative to said saddle, whereby the said saddle is supported adjacent the ends thereof as well as intermediate its ends upon a rigid bed in a manner preventing deflection of said saddle regardless of the position of a load supported thereon.

HALLIS N. STEPHAN.

References Cited in the file of this patent

UNITED STATES PATENTS

| Number | Name | Date |
|---|---|---|
| 1,141,871 | Hagman et al. | June 1, 1915 |
| 1,302,395 | McCarty | Apr. 29, 1919 |
| 1,936,384 | Davis | Nov. 21, 1933 |
| 1,987,726 | Wilkerson et al. | Jan. 15, 1935 |
| 2,019,774 | Woytych | Nov. 5, 1935 |